Feb. 3, 1931.  L. AZARRAGA  1,791,112

CAMERA

Filed Oct. 10, 1927

INVENTOR.
LUIS AZARRAGA.
BY
ATTORNEYS.

Patented Feb. 3, 1931

1,791,112

UNITED STATES PATENT OFFICE

LUIS AZARRAGA, OF HEMPSTEAD, NEW YORK

CAMERA

Application filed October 10, 1927. Serial No. 225,061.

My invention relates to cameras.

On July 12, 1927, I filed an application, Serial #205,076, in which a novel attachment for a graflex or other similar type camera is fully disclosed. By means of said attachment a given or predetermined size of diaphragm opening may be instantaneously and automatically re-established should said opening, for any cause (in focusing for instance) be temporarily enlarged before the shutter release is tripped. In the operation of said attachment, two distinct and separate operations are required to be performed. First it is necessary to operate the diaphragm release and thereafter, thru a second operation, trip the shutter release.

The principal object of the present invention is to provide an appropriate means for coordinating or synchronizing the two aforementioned operations. Such means preferably comprises an operating lever or trip so formed and constructed and so related to the shutter release as to actuate, thru one and the same motion, first the diaphragm release mechanism, and immediately thereafter, and with a very minimum of time interval, the ordinary shutter release. An operating means thus characterized is advantageous in that a mistake in the sequence of operation of the coordinated mechanisms cannot occur, and further, in that the operation of the attachment, considered in its entirety, is very much improved and simplified. For a better understanding of the advantages and purposes of said attachment, reference should be had to the co-pending application above mentioned.

In the drawings, wherein like reference characters denote like or corresponding parts, Fig. 1 is a front elevation of a graflex type camera showing the attachment as modified by the provision of the synchronizing feature thereof;

Figure 1:
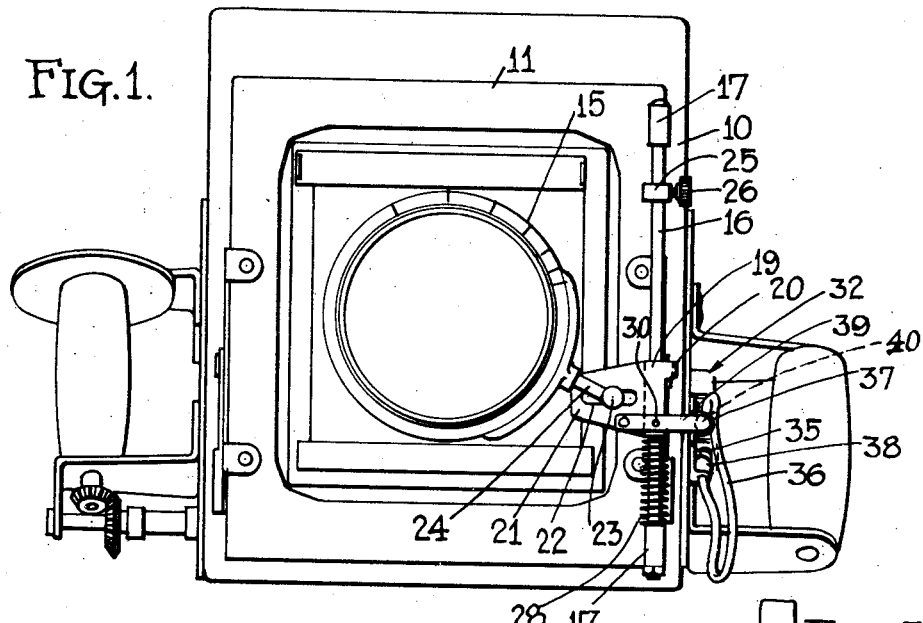

In the embodiment of the invention selected for illustration a conventional graflex type camera is shown. It comprises a box or casing 10, a lens carriage 11, bellows 12, lens 13 and diaphragm 14, the latter (in a graflex) being of the iris type and controlled by a milled ring 15 on which the so-called $f$ markings are indicated. The lens carriage 11 is adapted to be racked back and forth by any suitable means. By giving to the ring 15 a fractional turn, the diaphragm opening can be varied in size as desired.

Figures 2, 3:
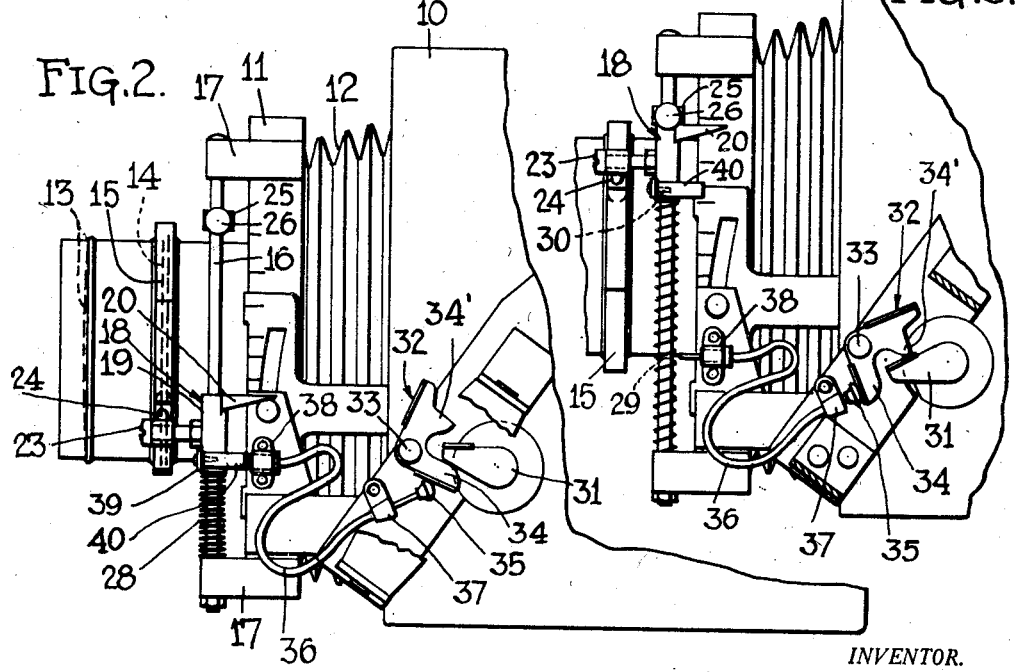
Fig. 2 is a side elevation.
Fig. 3 is a view similar to Fig. 2 showing the operating lever depressed.

As explained in said co-pending application, there is provided at one side of the lens carriage 11 a guide 16 in the form of a rod supported at its opposite ends in suitable brackets 17. Along this rod a special fitting or angle bracket 18 is adapted to slide. Said angle bracket (see Figs. 1 and 2) comprises a sleeve-like body portion 19, an indicator 20, and a plate extension 21, the latter having formed therein a transverse slot 22. Within the slot 22 a pin 23 is fitted, said pin at its outer end being fastened to an arm 24 carried by the adjusting ring 15. By sliding the angle bracket 18 along said rod the adjusting ring 15 may be turned either to the right or left and the diaphragm opening accordingly made larger or smaller as desired. As the angle bracket is slid back and forth on the rod 16, the pin 23 is adapted to move back and forth lengthwise the slot 22.

The rod or guide 16 in addition to the bracket 18 has mounted thereon a stop or collar 25. This stop or collar 25 is adjustable lengthwise the rod and is adapted to be set in its adjusted position by means of a setscrew 26. The function of the collar 25 is that of a stop against which the bracket 18 is adapted to bear in its finally adjusted position. If desired, a scale 27 having markings thereon similar to the $f$ markings on the adjusted ring 15 may be provided at one side of the guide 16. With the markings on said scale the indicator 20 is adapted to cooperate.

To urge the bracket 18 toward the stop 25 a coil spring 28 is provided. Said coil spring 28 is preferably mounted on the rod 16 to bear at one end on the lower supporting bracket 17 and at its opposite end on the sliding bracket 18. A notch 29 formed in the rod or guide 16 and within which a pin 30 is adapted to engage, serves as a means for releasably locking the bracket 18, and hence the diaphragm 14 in that position of adjustment wherein the diaphragm opening is fully enlarged.

In a graflex camera the shutter release or trip is usually mounted at one side of the casing 10. Such shutter release or trip is herein designated as 31. Where a diaphragm adjusting mechanism such as that above briefly described is provided, it is essential, in using the camera, to operate and release such mechanism immediately preceding the tripping of the shutter release. Otherwise, the temporarily enlarged diaphragm opening, at the moment of exposure, would remain enlarged.

The means for coordinating or synchronizing the operation of said mechanisms, i. e., the diaphragm release mechanism and the shutter release mechanism, preferably comprises an operating lever 32 pivoted and supported as at 33 at one side of the shutter release 31. Said lever 32 (see Figs. 2 and 3) is shaped to provide two contact members 34 and 34', one of which, the member 34, is engageable with the head 35 of a Bowden wire 36, and the other of which, the member 34', as the lever is depressed is engageable with the shutter release 31. The wire 36 is fastened as at 37 to the casing 10 at one end, and at its opposite end is fastened as at 38 to the lens carriage framed directly opposite the notch 29 formed in the rod 16.

The pin 30, which is adapted to engage in the notch 29 of the rod 16, is mounted on a leaf spring 39 fastened to the sliding bracket 18. At its free end the spring 39 extends beyond the bracket 18 and is provided with an arm 40 with which the wire 36 is engageable when pushed forward by the lever 32. As the lever 32 is depressed, the wire, by its engagement with the arm 40, will so move the spring 39 as to withdraw the pin 30 from its engagement in the notch 29 of the guide. Thus released, the bracket 18, under the urge of the spring 28 will automatically slide along the rod 16 until stopped by the collar 25. By providing a gap between the contact member 34' of the lever 32 and the shutter release 31, the latter, under no circumstances, can be actually tripped until after the wire 36 shall have been sufficiently moved by the contact member 34 to release the diaphragm adjusting means. In other words, a definite sequence of operation of the two mechanisms is maintained: First the diaphragm adjusting mechanism is released, and immediately thereafter the shutter release 31 is tripped—both operations occurring as a direct result of the full depression of the operating lever 32. A spring (not shown) enclosed in the casing for the wire 36 acts to return said wire to its normal position when the lever 32 is released. Moreover, the wire 36, being flexible, will in no way interfere, when focusing, with the racking or back and forth movement of the lens carriage.

An attachment characterized as above set forth is advantageous in that better negatives, with less likelihood of a mistake in the taking thereof can be obtained in a shorter period of time. With the stop 25 set, the bracket 18 can be forced along the guide 16 until the pin 30 enters the notch 29 in the guide. In thus moving the bracket the spring 28 is compressed and at the same time the diaphragm opening is fully enlarged. From then on the action of the attachment is essentially automatic. As the operating lever 32 is depressed the wire 36 is pushed and the pin 30 forced out of the notch 29 to release the sliding bracket 18. The bracket, when released, under the urge of the spring 28, slides along the rod 16, and in so moving, rotates the diaphragm adjusting ring 15 to thereby decrease the size of the diaphragm opening. Such sliding movement continues until stopped by the set collar 25, in which position of adjustment that size of diaphragm opening previously determined as the proper size, is automatically re-established. The desired size of diaphragm opening having been thus automatically re-established, the continued depression or movement of the lever 32 will immediately thereafter trip the shutter release 31.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a camera, an adjustable diaphragm, a ring rotatable to adjust said diaphragm, an arm extending off from said ring, a guide mounted at one side of said diaphragm, a bracket slidable along said guide to rotate said ring and adjust said diaphragm by its engagement with said arm, a spring acting on said bracket to slide it in one direction along said guide, latch mechanism operable to releasably fasten said bracket against sliding movement along said guide under the urge of said spring, and means operable to release said latch mechanism.

2. In a camera, an adjustable diaphragm, a ring rotatable to adjust said diaphragm, an arm extending off from said ring, a guide-rod mounted at one side of said diaphragm, a spring encircling said rod, a bracket bearing at one end on said spring and slidable along said rod to rotate said ring by its engagement with said arm, an adjustable stop mounted on said rod to limit the sliding movement of said bracket, latch mechanism operable to releasably fasten said bracket against sliding movement along said guide, and means operable to release said latch mechanism.

3. In a camera, the combination, of an adjustable diaphragm, a ring rotatable to adjust said diaphragm, a guide mounted at one side of said diaphragm, said guide having associated with it a series of markings by means of which the various diaphragm adjustments are accurately indicated, a bracket slidable along said guide and operatively connected with said ring to adjust said diaphragm according to its sliding movement, and an indicator movable with said bracket across said markings.

4. In a camera, the combination, with a shutter and a shutter release, of an adjustable diaphragm, a ring rotatable to adjust said diaphragm, an arm extending off from said ring, a guide mounted at one side of said diaphragm, a bracket slidable along said guide to rotate said ring and adjust said diaphragm by its engagement with said arm, a spring acting on said bracket to slide it in one direction along said guide, latch mechanism operable to releasably fasten said bracket against sliding movement under the urge of said spring, and an operating lever movable to first release said latch mechanism and immediately thereafter, thru its continued movement, trip said shutter release.

5. In a camera, the combination, with a shutter and a shutter release, of an adjustable diaphragm, a ring rotatable to adjust said diaphragm, an arm extending off from said ring, a guide-rod mounted at one side of said diaphragm, a bracket slidable along said rod to rotate said ring and adjust said diaphragm by its engagement with said arm, a spring encircling said rod and acting on said bracket to slide it in one direction along said rod, an adjustable stop mounted on said rod to limit the sliding movement of said bracket, latch mechanism operable to releasably fasten said bracket against sliding movement under the urge of said spring, and a lever operable to release said latch mechanism and immediately thereafter, thru its continued movement, trip said shutter release.

6. In a camera, the combination, with a shutter and a shutter release, of an adjustable diaphragm, a ring rotatable to adjust said diaphragm, a guide mounted at one side of said diaphragm, a bracket slidable along said guide to rotate said ring and adjust said diaphragm, a spring acting on said bracket to slide it in one direction along said guide, an adjustable stop carried by said guide to limit the sliding movement of said bracket, latch mechanism operable to releasably fasten said bracket against sliding movement under the urge of said spring, a flexible member movable to release said latch mechanism, said member at one end terminating in the vicinity of said shutter release, and a lever operable in its initial stage to move said member and in its final stage to trip said shutter release.

In testimony whereof I hereunto affix my signature.

LUIS AZARRAGA.